C. R. SCHMIDT.

WATER CLOSET.

No. 11,441. Reissued Sept. 11, 1894.

Witnesses:

J. B. McGirr.

F. A. Cook.

Inventor

Charles R. Schmidt

By Connolly Bros.

Attys

UNITED STATES PATENT OFFICE.

CHARLES R. SCHMIDT, OF BALTIMORE, MARYLAND.

WATER-CLOSET.

SPECIFICATION forming part of Reissued Letters Patent No. 11,441, dated September 11, 1894.

Original No. 423,182, dated March 11, 1890. Application for reissue filed January 2, 1892. Serial No. 416,901.

*To all whom it may concern:*

Be it known that I, CHARLES R. SCHMIDT, of the city of Baltimore, in the State of Maryland, have invented a new and useful Improvement in Water-Closets, of which the following is a specification.

My invention is in the nature of an improvement upon what is known as a "wash-out siphon closet;" and it consists of an all porcelain hopper and trap with flushing-rim and a special passage-way connected with supply and leading to the bottom of the hopper, and having also a bent or tortuous discharge-outlet forming a siphon above the level of the floor, whereby both suction and force are used together for emptying the hopper, which normally stands filled to a considerable depth with water, which is taken from a tank located above the level of the closet.

Figure 1:
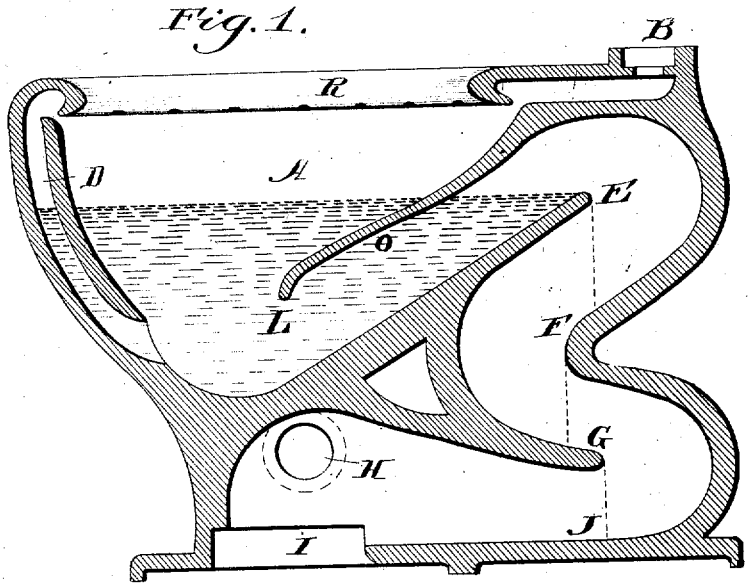
Figure 2:
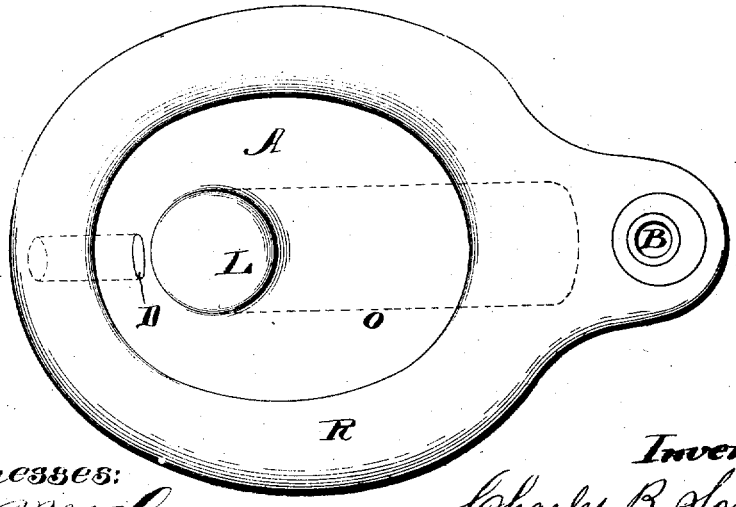

Figure 1, is a vertical longitudinal central section of the closet, and Fig. 2 is a plan view of the same.

A, is the porcelain hopper, which is formed with a hollow perforated flushing-rim R, which receives its water from a pipe leading to the tank above and connected to the flushing-rim at the point B. The discharge-outlet, O, is formed by an overhanging lip, L, and the outer end of this discharge outlet is high enough to cause the lip L, to form a trap and retain a considerable body of water in the hopper, the normal level of which reaches about half-way to the flushing-rim from the bottom of the hopper. From the front part of the flushing rim there extends down along the hopper, in its front wall, a passage way, D, which opens into the hopper at or near its bottom, and is arranged to deliver a forcible stream of water directly into the mouth of the outlet, O, forming a species of ejector that scours along the bottom of the hopper and up the outlet-passage O, to forcibly eject the paper or solid matter that gravitates to this point. This passage-way D, is formed in the wall of the hopper, and is always in open communication with both the flushing-rim and the hopper.

From the hopper the outlet O makes a sharp bend of about one hundred and eighty degrees near the top of the hopper, as at E, then makes another reverse bend at F, and again at the bottom of the hopper makes another sharp bend at G, which reaches the base J of the hopper, which rests upon the floor. The relation of these bends at E, F, and G, forms an important part of the invention which secures the siphoning of the contents of the hopper. It will be observed that the inner wall of bend E and the inner wall of bend C, are in a vertical line which extends past the projection F of the intermediate bend, as shown by the dotted lines. The result of this arrangement is that when the water in the hopper begins to discharge over the bend E it falls against the opposite side of the channel, striking it at F, cutting off the air from below, and from F to G falls across the passage-way again, cutting off the air also at this point, and as the air above these points is being rapidly drawn out by the falling water, and air cannot rise from the waste-pipe at I on account of the sealing of the cross-section of the passage-way by the falling water at E, F and F G and G I, it will be seen that the siphon principle which is set up quickly sucks the water out of the hopper, being assisted by the forcible stream of water entering through D.

To secure the best results of my invention, the point F should extend past the vertical line of points E and G; but this is not absolutely necessary, for if the points are in the same line, or if F is slightly to the right hand of E G, the principle of my invention will still be preserved with a good degree of efficiency, for the volume of water falling will fill up the space and make an effectual seal of the cross-section of this crooked passage-way, and thus prevent the rise of air from the waste-pipe, so as to still secure the benefits of the siphon principle. I is the outlet connection for the waste-pipe, (which is in the nature of a recessed seat) to receive a thimble or sleeve for connecting with the waste-pipe. Just above this point there is formed an elevated chamber having a vent-outlet H, to connect with the ventilating-pipe leading to the roof of the building, which vent is above the level of the floor base, but below the siphon.

I am aware that in siphon water closets it is not new to arrange the discharge-pipe in zigzag form, as shown in British Patent No. 577 of 1870, and that it is not new to lead a stream of water from the flushing-rim down to the bottom of the hopper, so as to discharge into the outlet of the hopper, and I do not claim these features broadly. When, however, the three bends of the zigzag discharge pipe are all placed above the floor and incorporated with the hopper, as at E, F, G, the fall of water is so short that I find it necessary to the perfect siphoning of the closet to have the forcible stream through passage D to empty into the discharge-pipe O, and hence these features have a co-ordinated effect in my closet.

Having thus described my invention, what I claim as new is—

1. A siphon water closet, with flushing rim and a passage leading to the bottom of the hopper and having a bent or tortuous discharge outlet forming a siphon above the level of the floor, whereby both suction and force are used together for emptying the hopper.

2. A siphon water closet with flushing rim and a passage leading therefrom to the bottom of the hopper and having a bent or tortuous discharge outlet forming a siphon above the level of the floor, whereby both suction and force are used together for emptying the hopper.

3. A siphon water-closet having a trapped discharge-passage O and a channel-way D, communicating with the flushing-rim and opening into the mouth of the discharge-passage, and the continuation of said discharge-passage being bent three times in zigzag form above the floor-level, with the inner walls E, F, G of these bends approximately in a vertical line, substantially as shown and described.

4. A siphon water-closet having but a single trap formed in the bottom of the bowl or hopper, a siphoning passage-way beneath the same provided with three bends, with the inner walls E F G of these bends approximately in a vertical line, and an air-outlet for connection with the vent-pipe, the said outlet being located between the siphoning passage-way and the soil-pipe, substantially as shown and described.

CHARLES R. SCHMIDT.

Witnesses:
CHARLES E. BARBER,
D. B. GALLATIN.